(12) United States Patent
Peng

(10) Patent No.: US 9,368,054 B2
(45) Date of Patent: Jun. 14, 2016

(54) PIXEL ARRAY AND FLAT-PANEL DISPLAY HAVING THE PIXEL ARRAY

(71) Applicant: EverDisplay Optronics (Shanghai) Limited, Shanghai (CN)

(72) Inventor: Shihwei Peng, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 216 days.

(21) Appl. No.: 14/103,543

(22) Filed: Dec. 11, 2013

(65) Prior Publication Data

US 2015/0016103 A1  Jan. 15, 2015

(30) Foreign Application Priority Data

Jul. 10, 2013 (CN) .......................... 2013 1 0290184

(51) Int. Cl.
  *G09G 3/20* (2006.01)
  *G02F 1/1335* (2006.01)

(52) U.S. Cl.
  CPC ............ *G09G 3/20* (2013.01); *G02F 1/133514* (2013.01); *G02F 2201/52* (2013.01); *G09G 2300/0452* (2013.01); *G09G 2300/0465* (2013.01)

(58) Field of Classification Search
  CPC .............. G09G 2300/0452; G09G 2300/0465; G09G 2300/0443; G09G 3/20; G09G 3/2003; G09G 2300/0439; G02F 2201/52; G02F 1/133514
  USPC .................................................. 349/106–109
  See application file for complete search history.

(56) References Cited

U.S. PATENT DOCUMENTS

| 7,417,648 | B2* | 8/2008 | Credelle ........... G02F 1/133514 345/690 |
| 2003/0128225 | A1* | 7/2003 | Credelle ........... G02F 1/133514 345/694 |
| 2009/0058873 | A1* | 3/2009 | Brown Elliott ......... G06T 5/009 345/589 |
| 2010/0118045 | A1* | 5/2010 | Brown Elliott .... G02B 27/2214 345/589 |

(Continued)

FOREIGN PATENT DOCUMENTS

| CN | 102243828 A | 11/2011 |
| CN | 102809826 A | 12/2012 |

(Continued)

OTHER PUBLICATIONS

Office Action issued Sep. 9, 2015 by the TW Office.

(Continued)

*Primary Examiner* — Paul Lee
*Assistant Examiner* — Jia Pan
(74) *Attorney, Agent, or Firm* — Yunling Ren; Eaton & Van Winkle

(57) ABSTRACT

The present application discloses a pixel array and a flat panel display having the pixel array. The pixel array includes a plurality of rows and columns of sub-pixel basic unit, and every sub-pixel basic unit having a blue sub-pixel, a red sub-pixel and a green sub-pixel, wherein: every sub-pixel basic unit presents a plurality of pixels; an arrangement proportion of the blue sub-pixel in a row direction and a column direction is that one blue sub-pixel is assigned for every two pixels; and any two red sub-pixels are not adjacent to each other and any two green sub-pixels are not adjacent to each other in the row direction and in the column direction. The present application may enable the flat panel display to have a better visual effect and may save sub-pixels.

10 Claims, 5 Drawing Sheets

(56) References Cited

U.S. PATENT DOCUMENTS

| | | | |
|---|---|---|---|
| 2011/0285753 A1* | 11/2011 | Park | G09G 3/2003 345/690 |
| 2013/0050282 A1 | 2/2013 | Kim et al. | |

FOREIGN PATENT DOCUMENTS

| | | |
|---|---|---|
| CN | 103137023 A | 6/2013 |
| JP | 01314084 | 12/1989 |
| JP | 06324649 | 11/1994 |
| JP | 2004233523 A | 8/2004 |
| JP | 2004317726 | 11/2004 |
| JP | 2005128190 | 5/2005 |
| JP | 2007114321 | 5/2007 |
| TW | 200801718 A | 1/2008 |
| TW | 200828203 A | 7/2008 |
| WO | WO-02091348 A1 | 11/2002 |
| WO | WO-2007088656 | 8/2007 |
| WO | WO-2010013421 | 2/2010 |

OTHER PUBLICATIONS

Office Action issued Apr. 10, 2015 by the JP Office.
Office Action issued on Mar. 2, 2016 by the CN Office.

* cited by examiner

PIXEL ARRAY AND FLAT-PANEL DISPLAY HAVING THE PIXEL ARRAY

CROSS-REFERENCE TO RELATED APPLICATIONS

This application claims benefits of Chinese Patent Application No. 201310290184.5, filed on Jul. 10, 2013 in the State Intellectual Property Office of China, the disclosure of which is incorporated herein by reference in its entirety.

TECHNICAL FIELD

The present disclosure relates to flat panel display technical fields, and in particular to a pixel array and a flat panel display having the pixel array.

BACKGROUND

Human vision has luminance perception and chrominance perception, both of which come from cone cells of retina.

Depending on photopigments, the cone cells may be classified into three photoreceptors which respectively receive three essential colors, i.e., red, green and blue, in a spectrum. In the cone cells, red and green cone cells are the majority and blue cone cells are in very small quantity. The luminance perception is completely determined by intensity perceived by the red and green cone cells, and the blue cone cells show little contribution. Thus, human eye may see a profile of an image, i.e., an edge having a relatively high image contrast. A first stage of the chrominance perception is determined by the intensity perceived by the three kinds of cone cells, outputs of the cone cells are not directly transmitted into human brain but are encoded into two signals, i.e., red/green and yellow/blue signals, in nerves of the retina at a second stage. Human eye has a significantly lower resolution to the two signals than the resolution of the luminance perception, and thus even the resolution of the chrominance signal is lowered, it cannot be perceived by the human eye.

However, the pixel array of a flat panel display in the related art usually consists of three sub-pixels including red, green and blue sub-pixels which are the same in quantity, and this is different from the proportion of quantity of the three photoreceptors of the human eye retina cone cells. As shown in FIG. 1, it is a pixel arrangement in a flat panel display having red, green and blue sub-pixel stripe arrangement (RGB-stripe) in the related art. This pixel arrangement is a 4×4 pixel array, in which every pixel consists of one red sub-pixel, one blue sub-pixel and one green sub-pixel, without considering the problem that the human eye has different resolutions with respect to different signals. In addition, every pixel needs three sub-pixels, which results in a problem that more sub-pixels are needed.

Thus, it is an important subject in the art to improve the arrangement of pixel array in a flat panel display having a red, green and blue sub-pixel stripe arrangement in the related art to develop a new pixel array which can save sub-pixels and enable the flat panel display to have a better visual effect.

SUMMARY OF THE INVENTION

Aiming at the problem existing in the related art, one of the objects of the present disclosure is to provide a pixel array to solve the technical problems in the related art that a pixel array are not adapted to the forming law of human eye vision, the visual effect is not good and more sub-pixels are needed.

Another object of the present disclosure is to provide a flat panel display having the pixel array according to the present disclosure with a novel pixel array.

Additional aspects and advantages will be set forth in part in the description which follows and, in part, will be apparent from the description, or may be learned by practice of the disclosure.

A pixel array is provided, which comprising sub-pixel basic units, each of the sub-pixel basic units comprising blue sub-pixels, red sub-pixels and green sub-pixels arranged in rows and columns; each of the sub-pixel basic units is capable of rendering a plurality of pixels; a proportion of the blue sub-pixel in a row direction and a column direction is one blue sub-pixel for every two pixels; and any two red sub-pixels are not adjacent to each other and any two green sub-pixels are not adjacent to each other in the row direction or in the column direction.

The flat panel display of the present disclosure has a pixel array of the present disclosure.

DESCRIPTION OF THE EMBODIMENTS

Exemplary embodiments reflecting features and advantages of the present disclosure will be described in the following description in detail. It shall be appreciated that the present disclosure can have various modifications to different embodiments, all of which will not depart from the scope of the present disclosure, and the description and drawings are used for illustration but not for limiting the present disclosure.

The pixel array according to embodiments of the present disclosure may be used in a flat panel display according to embodiments of the present disclosure. The flat panel display according to embodiments of the present disclosure has the pixel array according to embodiments of the present disclosure.

An example of the pixel array according to an embodiment of the present disclosure is a 4×4 pixel array, which has four sub-pixel basic units. Every sub-pixel basic unit has eight sub-pixels arranged in two rows and four columns. The two rows include a first sub-pixel row and a second sub-pixel row, and the four columns include a first sub-pixel column, a second sub-pixel column, a third sub-pixel column and a fourth sub-pixel column. However, the present disclosure is not limited to the 4×4 pixel array, and the sub-pixel basic unit is not limited to have eight sub-pixels.

The eight sub-pixels are three red sub-pixels, three green sub-pixels and two blue sub-pixels, and may render four pixels. Specifically, the arrangement of the eight sub-pixels comprises: in the row direction, the first sub-pixel row consisted of four sub-pixels and the second sub-pixel row consisted of four sub-pixels. Wherein, in every sub-pixel row and every sub-pixel column, any two red sub-pixels are not adjacent to each other and any two green sub-pixels are not adjacent to each other; and the proportion of the blue sub-pixels in a row direction (i.e., the sub-pixel row direction) and a column direction (i.e., the sub-pixel column direction) is one blue sub-pixel for every two pixels.

In the array pixel according to an embodiment of the present disclosure, for example, two adjacent sub-pixels in the row direction jointly render one pixel.

The pixel array according to an embodiment of the present disclosure will be described below in detail.

The First Embodiment

Figure 1:
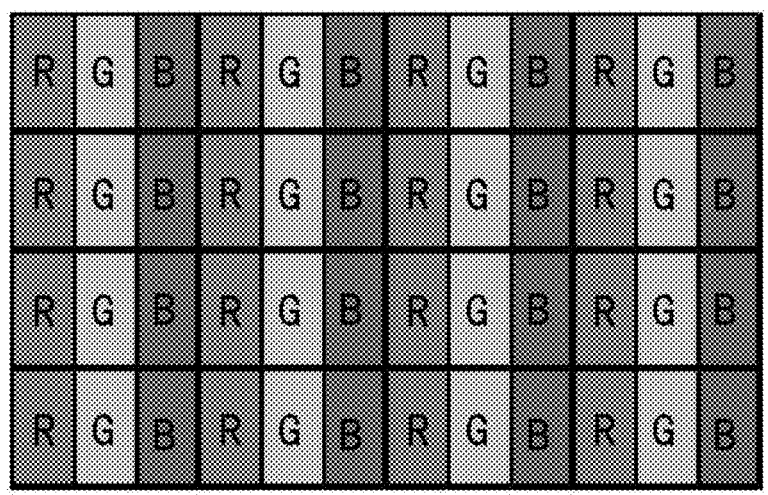
FIG. 1 is a schematic diagram of a pixel array of a flat panel display in the related art.
Figure 2:
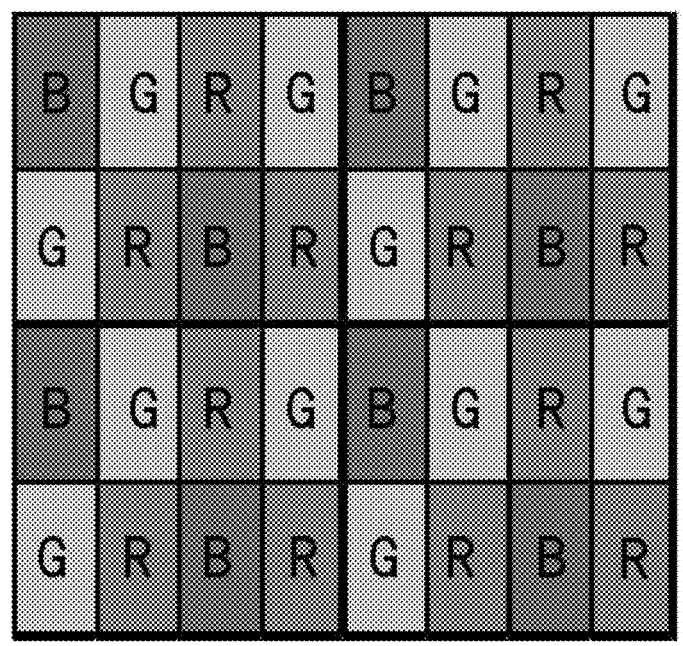
FIG. 2 is a schematic diagram of a pixel array according to a first embodiment of the present disclosure.
Figure 3:
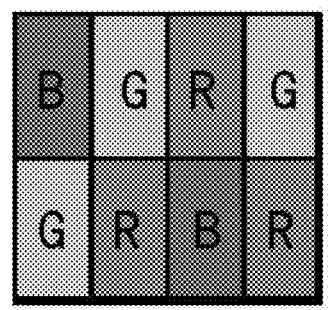
FIG. 3 is a schematic diagram of a sub-pixel basic unit of the pixel array according to the first embodiment of the present disclosure.

As shown in FIG. 2, the pixel array according to the present embodiment consists of same sub-pixel basic units arranged in two rows and two columns, and every sub-pixel basic unit consists of eight sub-pixels. As shown in FIG. 3, the eight sub-pixels are arranged in two rows and four columns, and the eight sub-pixels are classified into red sub-pixels R, green sub-pixels G and blue sub-pixels B. According to the feature of the red, green and blue cone cells of the human eye retina, the quantities of the red cone cells and the green cone cells are close and are larger than the quantity of the blue cone cells. Accordingly, the eight sub-pixels are divided into three red sub-pixels, three green sub-pixels and two blue sub-pixels. Since every two adjacent sub-pixels in the row direction render one pixel, the pixel array according to the present embodiment realizes an arrangement of 4×4 pixels using 32 sub-pixels, which allows to reduce 16 sub-pixels as compared with the pixel array shown in FIG. 1, i.e. 33% of sub-pixels are reduced.

As shown in FIG. 3, in the row direction, the first sub-pixel row includes, in order, a blue sub-pixel B, a green sub-pixel G, a red sub-pixel R and a green sub-pixel G, and the second sub-pixel row includes, in order, a green sub-pixel G, a red sub-pixel R, a blue sub-pixel B and a red sub-pixel R.

As shown in FIG. 3, the green sub-pixels G are separated by the red sub-pixel in the first sub-pixel row, the red sub-pixels are separated by the blue sub-pixel in the second sub-pixel row, and the adjacent sub-pixels in the first sub-pixel row and the second sub-pixel row are different. In the column direction, the red sub-pixels R in every column are not adjacent to each other, and this is the same with the green sub-pixels G. The arrangement of the blue sub-pixels is that one blue sub-pixel B is configured for every two pixels in the row direction and in the column direction. As shown in FIG. 3, in the row direction, the proportions of the blue sub-pixels B in the first sub-pixel row and in the second sub-pixel row are one blue sub-pixel B for every two pixels, i.e., one blue sub-pixel B is provided in each of the first sub-pixel row and the second sub-pixel row. In the column direction, two pixels of the first sub-pixel column and the second sub-pixel column and two pixels of the third sub-pixel column and the fourth sub-pixel column are respectively configured with one blue sub-pixel B, i.e., one blue sub-pixel B is provided in the first and second column and one in the third and fourth column.

The Second Embodiment

In the present embodiment, the quantity of the sub-pixels in the pixel array is the same as that in the first embodiment, and pixel rendering, the number of rows and columns and the sub-pixel proportion in every sub-pixel basic unit are the same as that in the first embodiment except for the difference of specific arrangement of the sub-pixels in sub-pixel basic units.

Figure 4:
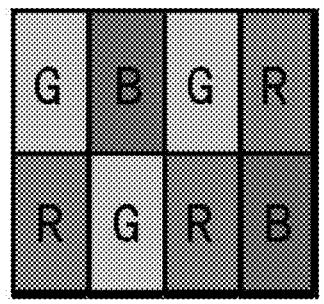
FIG. 4 is a schematic diagram of a sub-pixel basic unit of a pixel array according to a second embodiment of the present disclosure.

As shown in FIG. 4, according to the pixel array of the present embodiment, in the sub-pixel basic unit, the first sub-pixel row includes, in order, a green sub-pixel, a blue sub-pixel, a green sub-pixel and a red sub-pixel, and the second sub-pixel row includes, in order, a red sub-pixel, a green sub-pixel, a red sub-pixel, and a blue sub-pixel.

As shown in FIG. 4, in the present embodiment, the green sub-pixels G are separated by the blue sub-pixel B in the first row, the red sub-pixels R are separated by the green sub-pixel G in the second row, and the green sub-pixels are not adjacent to each other in the row direction or in the column direction, which is the same with the red sub-pixels. The arrangement of the blue sub-pixels B is that, every two pixels are configured with one blue sub-pixel B in the row direction, i.e., one blue sub-pixel B is configured for every row; every two pixels are configured with one blue sub-pixel B in the column direction, i.e., one blue sub-pixel B is configured for every two columns.

The Third Embodiment

In the present embodiment, the difference from the first embodiment lies in the specific arrangement of the sub-pixels in the sub-pixel basic units.

Figure 5:
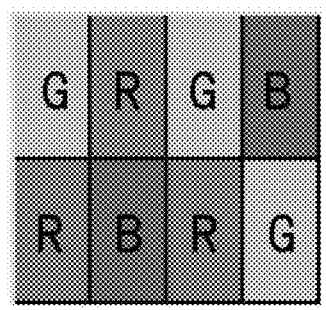
FIG. 5 is a schematic diagram of a sub-pixel basic unit of a pixel array according to a third embodiment of the present disclosure.

As shown in FIG. 5, according to the pixel array of present embodiment, in the sub-pixel basic unit, the first sub-pixel row includes, in order, a green sub-pixel, a red sub-pixel, a green sub-pixel and a blue sub-pixel, and the second sub-pixel row includes, in order, a red sub-pixel, a blue sub-pixel, a red sub-pixel and a green sub-pixel.

As shown in FIG. 5, in the present embodiment, the green sub-pixels are separated by the red sub-pixel R in the first row, the red sub-pixels R are separated by the blue sub-pixel B in the second row, and the green sub-pixels are not adjacent to each other in the row direction or in the column direction, which is the same with the red sub-pixels. The arrangement of the blue sub-pixels B is that, every two pixels are configured with one blue sub-pixel B in the row direction, i.e., one blue sub-pixel B is configured for every row; every two pixels are configured with one blue sub-pixel B in the column direction, i.e., one blue sub-pixel B is configured for every two columns.

As seen from the above description, the present disclosure may have one or more of the following technical effects. In the pixel array and the flat panel display having the pixel array according to the present disclosure, every sub-pixel basic unit has eight sub-pixels and may render four pixels. Compared with the arrangement in the related art having a red, green and blue color strip arrangement in which twelve sub-pixels are needed to present four pixels, less sub-pixels are needed. In addition, in the sub-pixel basic unit of the pixel array according to the present disclosure, there are three red sub-pixels, three green sub-pixels and two blue sub-pixels, and this proportion (the quantity of red or green sub-pixels are close and larger than that of the blue sub-pixels) is close to the nature of the cone cells of the human eye retina, and thus a better visual effect may be obtained as compared with the flat panel display in the related art.

One of ordinary skill in this art shall appreciate that changes and modifications without departing from the scope and spirit of the present disclosure as disclosed by appended claims will fall within the protection scope of the claims of the present disclosure.

What is claimed is:

1. A pixel array comprising sub-pixel basic units, each of the sub-pixel basic units comprising blue sub-pixels, red sub-pixels and green sub-pixels arranged in rows and columns; wherein:

each of the sub-pixel basic units is capable of rendering a plurality of pixels;

a proportion of the blue sub-pixel in a row direction and a column direction is one blue sub-pixel for every two pixels; and any two red sub-pixels are not adjacent to each other and any two green sub-pixels are not adjacent to each other in the row direction or in the column direction;

wherein each of the sub-pixel basic units comprises three red sub-pixels, three green sub-pixels and two blue sub-pixels; each of the sub-pixel basic units renders four pixels; every two adjacent sub-pixels in the row direction jointly renders one of the pixels; sub-pixels in each of the sub-pixel basic units are arranged in two rows and four columns; the two rows comprises a first sub-pixel row and a second sub-pixel row, the two blue sub-pixels are arranged in a first column and a third column respectively, or the two blue sub-pixels are arranged in a second column and a fourth column respectively.

2. The pixel array according to claim 1, wherein the pixel array comprises two rows and two columns of the sub-pixel basic units.

3. The pixel array according to claim 1, wherein the first sub-pixel row comprises, in order, a blue sub-pixel, a green sub-pixel, a red sub-pixel and a green sub-pixel, and the second sub-pixel row comprises, in order, a green sub-pixel, a red sub-pixel, a blue sub-pixel and a red sub-pixel.

4. The pixel array according to claim 1, wherein the first sub-pixel row comprises, in order, a green sub-pixel, a blue sub-pixel, a green sub-pixel and a red sub-pixel, and the second sub-pixel row comprises, in order, a red sub-pixel, a green sub-pixel, a red sub-pixel and a blue sub-pixel.

5. The pixel array according to claim 1, wherein the first sub-pixel row comprises, in order, a green sub-pixel, a red sub-pixel, a green sub-pixel and a blue sub-pixel, and the second sub-pixel row comprises, in order, a red sub-pixel, a blue sub-pixel, a red sub-pixel and a green sub-pixel.

6. A flat panel display comprising a pixel array, the pixel array comprising sub-pixel basic units, each of the sub-pixel basic units comprising blue sub-pixels, red sub-pixels and green sub-pixels arranged in rows and columns;

wherein:

each of the sub-pixel basic units is capable of rendering a plurality of pixels;

a proportion of the blue sub-pixel in a row direction and a column direction is one blue sub-pixel for every two pixels; and any two red sub-pixels are not adjacent to each other and any two green sub-pixels are not adjacent to each other in the row direction or in the column direction;

wherein each of the sub-pixel basic units comprises three red sub-pixels, three green sub-pixels and two blue sub-pixels; each of the sub-pixel basic units renders four pixels; every two adjacent sub-pixels in the row direction jointly renders one of the pixels; sub-pixels in each of the sub-pixels basic units are arranged in two row and four columns; the two rows comprises a first sub-pixel row and a second sub-pixel row, the two blue sub-pixels are arranged in a first column and a third column respectively, or the two blue sub-pixels are arranged in a second column and a fourth column respectively.

7. The flat panel display according to claim 6, wherein the pixel array comprises two rows and two columns of the sub-pixel basic units.

8. The flat panel display according to claim 6, wherein the first sub-pixel row comprises, in order, a blue sub-pixel, a green sub-pixel, a red sub-pixel and a green sub-pixel, and the second sub-pixel row comprises, in order, a green sub-pixel, a red sub-pixel, a blue sub-pixel and a red sub-pixel.

9. The flat panel display according to claim 6, wherein the first sub-pixel row comprises, in order, a green sub-pixel, a blue sub-pixel, a green sub-pixel and a red sub-pixel, and the second sub-pixel row comprises, in order, a red sub-pixel, a green sub-pixel, a red sub-pixel and a blue sub-pixel.

10. The flat panel display according to claim 6, wherein the first sub-pixel row comprises, in order, a green sub-pixel, a red sub-pixel, a green sub-pixel and a blue sub-pixel, and the second sub-pixel row comprises, in order, a red sub-pixel, a blue sub-pixel, a red sub-pixel and a green sub-pixel.

* * * * *